United States Patent
Fan

[11] Patent Number: 6,050,508
[45] Date of Patent: Apr. 18, 2000

[54] ROTATING DEVICE FOR A SHOWERHEAD

[76] Inventor: Chen-Yueh Fan, Room F/23, 4th Fl., No. 5, Sec. 5, Hsinyi Rd., Taipei, Taiwan

[21] Appl. No.: 09/281,780

[22] Filed: Mar. 31, 1999

[51] Int. Cl.$^7$ .................................................. B05B 15/08
[52] U.S. Cl. ........................................ 239/587.1; 285/280
[58] Field of Search ............................. 239/587.1, 587.2, 239/530, 11; 285/280, 281

[56] References Cited

U.S. PATENT DOCUMENTS

| | | | |
|---|---|---|---|
| 2,968,440 | 1/1961 | Cone | 239/587.1 |
| 3,385,525 | 5/1968 | Jacobs | 285/280 |
| 3,893,630 | 7/1975 | Bochmann et al. | 239/587.2 |
| 4,327,867 | 5/1982 | Jones et al. | 239/587.2 |
| 4,848,671 | 7/1989 | Saurwein | 239/587.1 |
| 4,899,940 | 2/1990 | Leaver | 239/530 |
| 5,199,639 | 4/1993 | Kobayashi et al. | 239/11 |
| 5,381,830 | 1/1995 | Neimann | 285/280 |

*Primary Examiner*—Andres Kashnikow
*Assistant Examiner*—Dinh Q. Nguyen
*Attorney, Agent, or Firm*—Rosenberg, Klein & Lee

[57] ABSTRACT

The rotating device for a shower head includes a hollow second connector having a first inner flange, an extension extending outward therefrom for connection with a hose in a water tight manner and having a centrally defined through hole, a sleeve having a second inner flange integrally formed therein, inner threads formed on the inner face thereof for connection with the showerhead and an annular protrusion integrally formed on the bottom thereof for rotatably rest on the first inner flange and a connecting member having an annular head formed on top thereof to rotatably rest on the second inner flange, a groove transversely defined therein for receiving an O-ring therein and a neck integrally extending through the sleeve and into the central through hole to be securely connected with an inner face defining the central through hole.

2 Claims, 4 Drawing Sheets

ROTATING DEVICE FOR A SHOWERHEAD

FIELD OF THE INVENTION

The invention relates to a rotating device for a showerhead, which is provided between the showerhead and the hose so as to allow the showerhead to be freely rotated with respect to the hose.

DESCRIPTION OF THE PRIOR ART

Conventional showerheads are not able to rotate with respect to the hoses connected thereto. When the showerhead is rotated, the hose is twisted. Not only is this inconvenient, but it may eventually damage either the hose or the connection between the hose and the showerhead.

A showerhead was introduced to the market to resolve the problems mentioned above. As shown in FIG. 4, a hollow connector (82) is threadingly attached to an existing threaded cover (81), which in turn is connected to a hose (80). The upper portion of the hollow connector (82) has a plurality of slits (83) and therefore, a plurality of strips are accordingly formed. The extreme end of each of the strips is curved radially outward to form a hook (84). A cover (86) is constructed to be inserted into a showerhead (85) so as to be securely engaged and have a watertight connection therewith. The hollow connector (82) is then inserted into the cover (86) until the hooks (84) engage the upper edge of the cover (86). An O-ring ring (87) may be provided between the cover (86) and the hollow connector (82) to prevent leakage.

Even though the product mentioned above fulfills the users' requirements, it still has drawbacks.

In order to have a secure engagement between the hollow connector (82) and the cover (86), outer edges of the hooks (84) form a diameter larger than the inner diameter of the cover (86), such that when the hollow connector (82) is inserted into the cover (86), the hollow connector (82) is able to have a snap fit with the cover (86). However, when the distal ends of the hooks (84) are inserted into the cover (86), deformation of each of the strips will easily cause damage to the hollow connector (82).

It is, therefore, a requirement to improve the existing product to fulfill the needs.

SUMMARY OF THE INVENTION

The objective of the invention is to provide a rotating device for a showerhead which, on the basis of present showerheads, provides free rotation to a showerhead with respect to a the hose.

DETAILED DESCRIPTION OF THE PREFERRED EMBODIMENT

Figure 1:
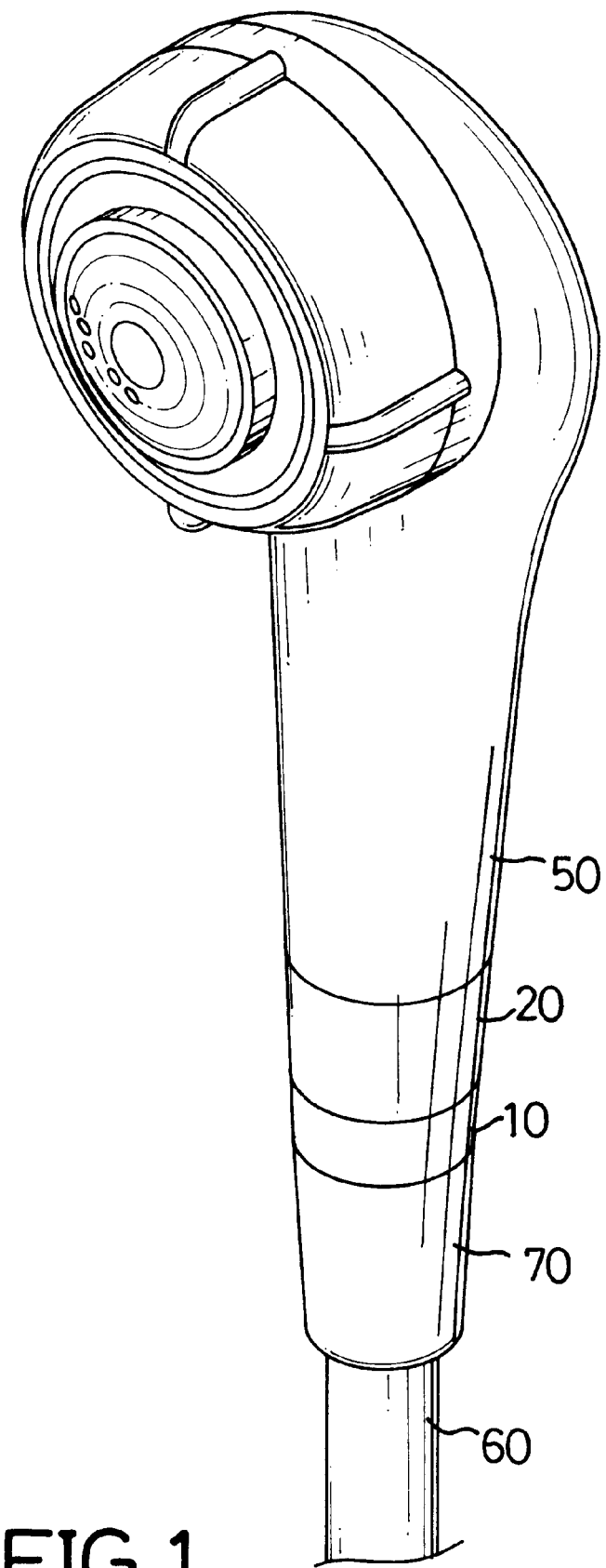
FIG. 1 is a perspective view of the invention showing the showerhead and the configuration thereof.
Figure 2:
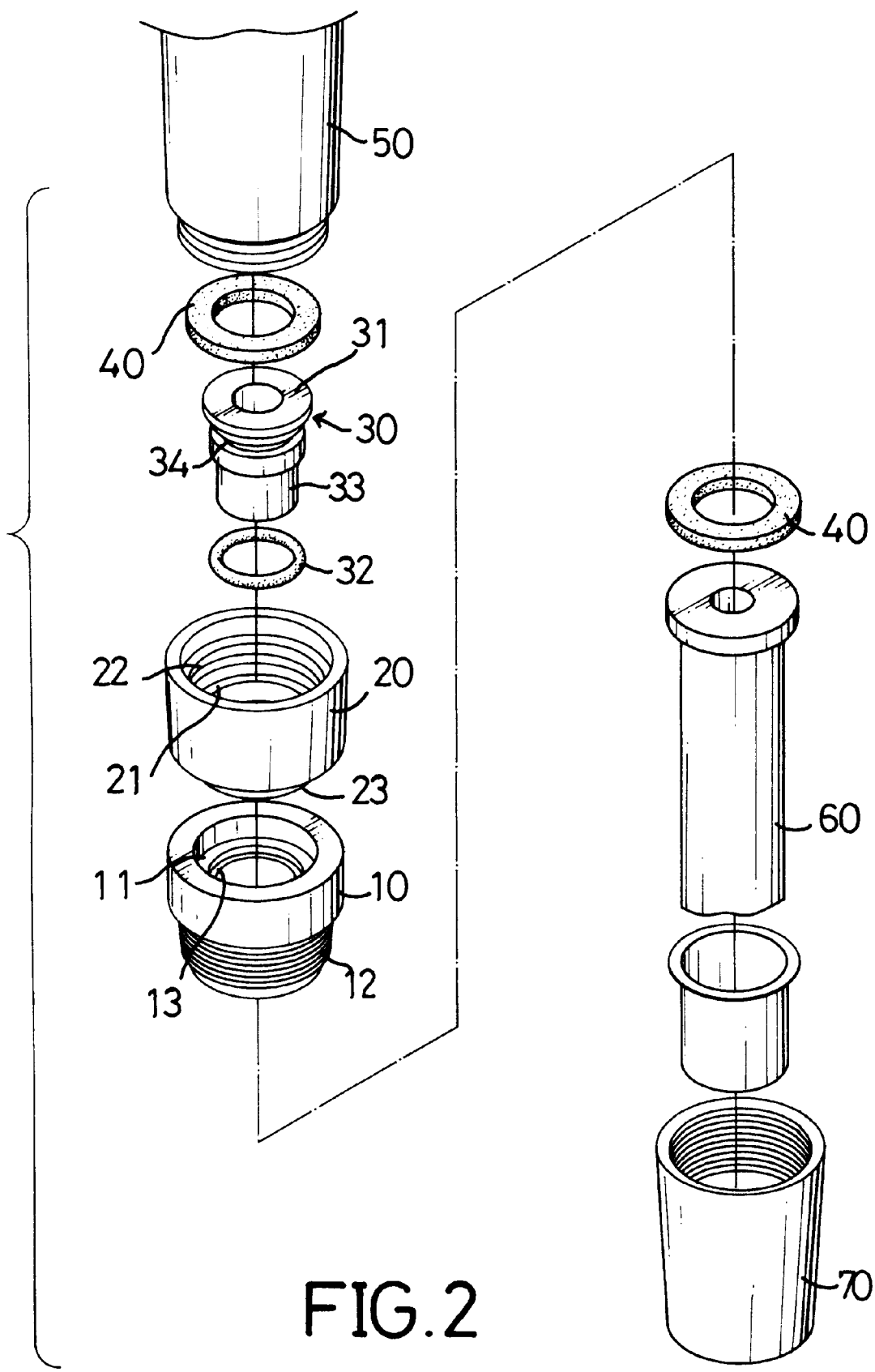
FIG. 2 is an exploded perspective view of the invention showing all the members of the invention and their relationship.

As shown in FIGS. 1 and 2, a rotating device for a showerhead is threadingly connected between a hose (60) and a showerhead (50) so as to enable the showerhead (50) to rotate with respect to the hose (60). The hose (60) inserted through and securely connected with a first connector (70) has a gasket (40) mounted on a distal end thereof.

The rotating device of the invention includes a hollow second connector (10) having a first inner flange (11), an extension (12) extending outward therefrom and into the first connector (70) of the hose (10) and having a centrally defined through hole (13), a sleeve (20) having a second inner flange (21) integrally formed therein, inner threads (22) formed on the inner face thereof and an annular protrusion (23) integrally formed on the bottom thereof and provided with a diameter smaller than that of the sleeve (20) and a connecting member (30) having an annular head (31) formed on top thereof, a groove (34) transversely defined therein for receiving a O-ring (32) therein and a neck (33) integrally extending therefrom.

Figure 3:
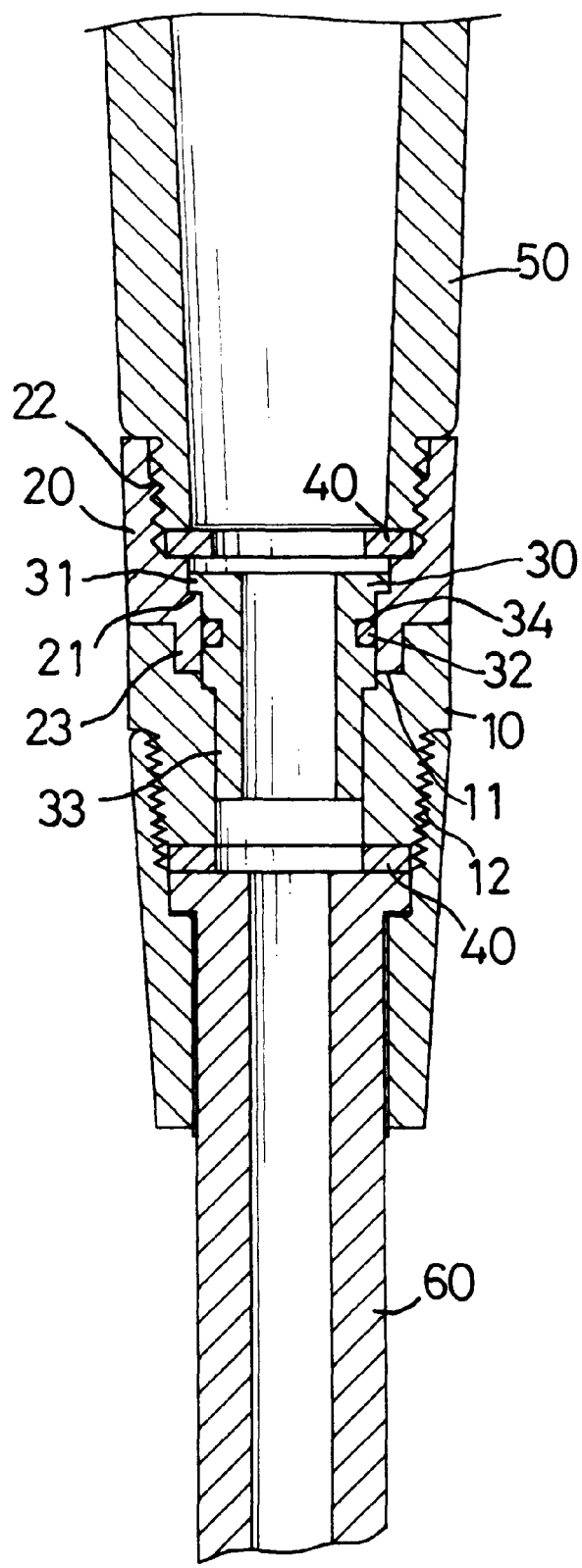
FIG. 3 is a side view in partial section of the invention showing the invention in assembled configuration.
Figure 4:
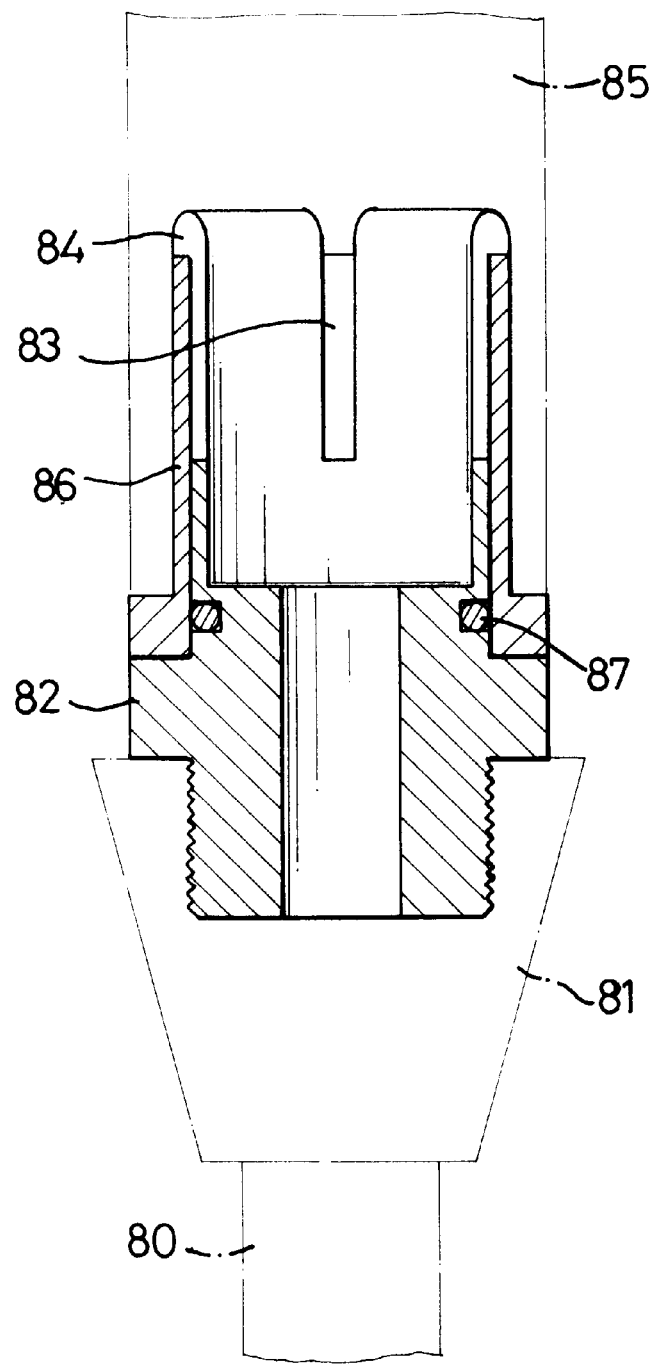
FIG. 4 is a side view in partial section of a conventional showerhead.

Referring to FIG. 3, when in assembly, the annular protrusion (23) of the sleeve (20) is rotatably seated on the first inner flange (11) of the second connector (10) and the neck (33) of the connecting member (30) extends through the sleeve (20) and into the second connector (10). Then, the neck (33) of the connecting member (30) is securely engaged with the inner face defining the central through hole (13) of the second connector (10) by ultrasound. While the neck (33) extends into the second connector (10), the annular head (31) rotatably rests on the second inner flange (21) of the sleeve (20). Thereafter, the second connector (10) threadingly connects with the first connector (70), and the inner threads (22) of the sleeve (20) threadingly connect with the showerhead (50) to finish the assembly of the invention.

Because the neck (33) of the connecting member (30) is securely connected with the inner face of the second connector (10) and the second connector (10) is threadingly connected with the first connector (70), the connecting member (30) basically has no relative motion with respect to the second connector (10). Due to the annular head (31) of the connecting member (30) being rotatably seated on the second inner flange (21) of the sleeve (20) which in turn threadingly connects with the shower head (50), a relative motion exists between the showerhead (50) and the hose (60), which allows the showerhead (50) to rotate freely.

From the above description, the advantages thereof could be drawn:

a. The invention can be used with present showerheads with no alteration of the showerhead or hose required.

b. Compared with the conventional "hook-edge" structure, the invention is more convenient to assemble and disassemble.

What is claimed is:

1. A rotating device for a shower head comprising:

a hollow second connector (10) having a first inner flange (11), an extension (12) extending outward therefrom for connect with a hose in a water tight manner and having a centrally defined through hole (13);

a sleeve (20) having a second inner flange (21) integrally formed therein, inner threads (22) formed on the inner face thereof for connection with the showerhead and an annular protrusion (23) integrally formed on a bottom thereof and adapted to be rotatably seated on the first inner flange (11); and a connecting member (30) having an annular head (31) formed on top thereof and adapted to be rotatably seated on the second inner flange (21) and a neck (33) integrally extending through the sleeve (20) and into the second connector (10) to be securely connected with an inner face defining the central through hole (13).

2. The rotating device as claimed in claim 1, wherein the connecting member (30) has a groove (32) transversely defined for receiving an O-ring therein.

* * * * *